(12) United States Patent
Key et al.

(10) Patent No.: US 7,537,255 B2
(45) Date of Patent: May 26, 2009

(54) ADJUSTABLE GRIPPER PADS

(75) Inventors: Timothy John Key, Onsted, MI (US); Scott Richard Carroll, Tecumseh, MI (US); Michael Arthur Filipiak, Ann Arbor, MI (US)

(73) Assignee: Syron Engineering & Manufacturing, LLC, Saline, MI (US)

( * ) Notice: Subject to any disclaimer, the term of this patent is extended or adjusted under 35 U.S.C. 154(b) by 0 days.

(21) Appl. No.: 11/678,091

(22) Filed: Feb. 23, 2007

(65) Prior Publication Data

US 2007/0200379 A1    Aug. 30, 2007

Related U.S. Application Data

(60) Provisional application No. 60/776,452, filed on Feb. 24, 2006.

(51) Int. Cl.
 *B25J 15/04* (2006.01)
(52) U.S. Cl. ............... 294/88; 294/902; 269/279
(58) Field of Classification Search ............ 294/88, 294/106, 115, 902; 901/37, 39; 269/34, 269/279–284; 81/422, 423
See application file for complete search history.

(56) References Cited

U.S. PATENT DOCUMENTS

| | | | | | |
|---|---|---|---|---|---|
| 294,736 | A | * | 3/1884 | Hyle | 269/279 |
| 1,321,208 | A | * | 11/1919 | Hinnershitz | 72/409.16 |
| 2,646,708 | A | * | 7/1953 | Nickas, Jr. | 269/279 |
| 3,322,456 | A | * | 5/1967 | Alexandrovich et al. | 294/88 |
| 4,083,547 | A | * | 4/1978 | Gurley | 269/156 |
| 4,109,953 | A | * | 8/1978 | Seymour | 294/118 |
| 4,133,519 | A | * | 1/1979 | Shin et al. | 269/247 |
| 4,291,870 | A | * | 9/1981 | Warde | 269/279 |
| 4,462,581 | A | | 7/1984 | Mitani | |
| 4,475,607 | A | | 10/1984 | Haney | |
| 4,537,099 | A | * | 8/1985 | Oster et al. | 225/93 |
| 4,645,411 | A | * | 2/1987 | Madwed | 414/753.1 |
| 5,579,667 | A | * | 12/1996 | Kim | 81/185.1 |
| 6,048,013 | A | | 4/2000 | Moilanen | |
| 6,176,533 | B1 | | 1/2001 | Moilanen | |
| 6,425,616 | B2 | | 7/2002 | Moilanen | |
| 6,557,916 | B2 | | 5/2003 | Moilanen | |
| 6,588,816 | B1 | | 7/2003 | Moilanen | |

* cited by examiner

*Primary Examiner*—Dean J Kramer
(74) *Attorney, Agent, or Firm*—Carlson, Gaskey & Olds

(57) ABSTRACT

A gripper tip for use with a gripper assembly includes a first gripping surface located at least partially within a first plane and a second gripping surface located at least partially within a second plane that is transverse to the first plane. The first gripping surface includes a first gripping height relative to a first attachment portion associated with the first gripping surface. The second gripping surface includes a second gripping height relative to a second attachment portion associated with the second gripping surface, and the second gripping height is greater than the first gripping height.

11 Claims, 4 Drawing Sheets

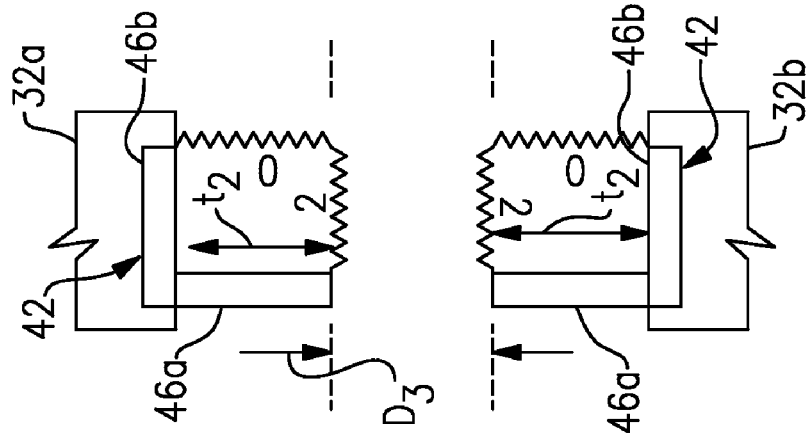
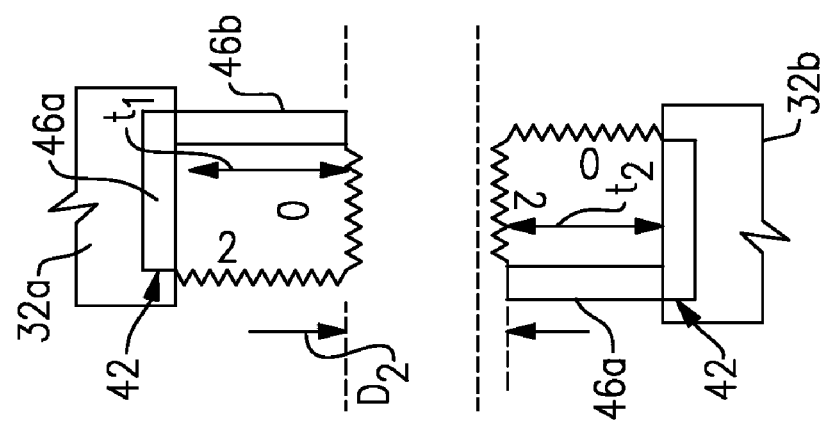
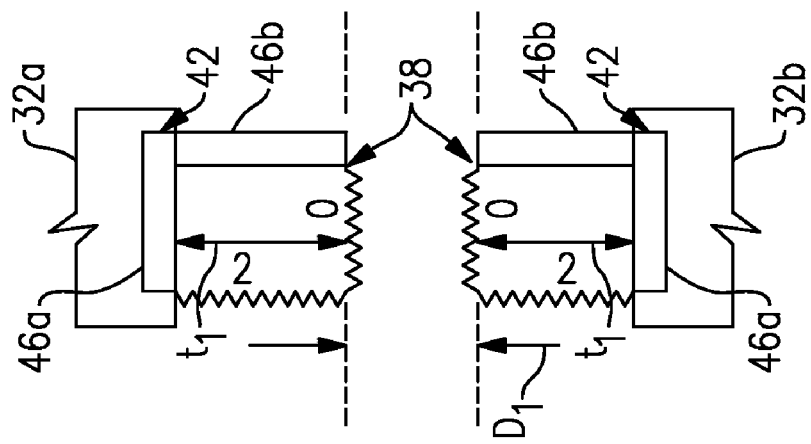

US 7,537,255 B2

ADJUSTABLE GRIPPER PADS

RELATED APPLICATIONS

The application claims priority to U.S. Provisional Application No. 60/776,452, which was filed on Feb. 24, 2006.

BACKGROUND OF THE INVENTION

This invention generally relates to automated handling equipment. More particularly, this invention relates to an actuated gripper device.

Automated handling equipment is typically employed in industrial settings for transferring work pieces between work stations. Typically, the equipment includes a gripper that clamps the work pieces while moving them between the stations. Conventional grippers include an actuator that moves one or more gripper jaws between open and closed jaw positions.

Typically, the jaws include removable gripper tips or pads that include teeth to facilitate gripping of the work pieces. The pads are removable and replaceable with different pads to provide different teeth or to accommodate different sizes or shapes of work pieces. For example, the pad thickness corresponds to the distance between the jaws in the open position. Thicker pads provide a shorter distance to accommodate thinner work pieces and thinner pads provide a longer distance to accommodate thicker work pieces.

Although conventional gripper pads are effective for clamping and transferring work pieces or other objects, using replaceable pads complicates use of the handling equipment, and pad replacement is time-consuming. Additionally, pads that are not in use require storage space and may become lost.

Accordingly, there is a need for a single gripper pad that is adjustable to accommodate work pieces of varying thicknesses. This invention addresses those needs and provides enhanced capabilities while avoiding the shortcomings and drawbacks of the aforementioned art.

SUMMARY OF THE INVENTION

An example gripper tip for use with a gripper assembly includes a first gripping surface located at least partially within a first plane and a second gripping surface located at least partially within a second plane that is transverse to the first plane. The first gripping surface includes a first gripping height relative to a first attachment portion associated with the first gripping surface. The second gripping surface includes a second gripping height relative to a second attachment portion associated with the second gripping surface.

An example gripper tip system for use with a gripper assembly includes two gripper tips. A first gripper tip is removably attachable to a gripper jaw in at least two different orientations relative to the gripper jaw. A second gripper tip is removably attachable to an opposed gripper jaw in at least two different orientations relative to the opposed gripper jaw. The different orientations of the gripper tips correspond to different heights of the gripper tips relative to the gripper jaws.

An example gripper assembly includes a first gripper jaw, a second gripper jaw, an automated actuator for moving the gripper jaws, a first gripper tip, and a second gripper tip. The gripper tips are removably attachable to the gripper jaws in at least two different orientations to provide at least three different possible jaw opening sizes between the first gripper tip and the second gripper tip for a given position of the gripper jaws.

These and other features of the present invention can be best understood from the following specification and drawings, the following of which is a brief description.

BRIEF DESCRIPTION OF THE DRAWINGS

FIG. 6A illustrates one possible orientation combination of the example gripper pads.

FIG. 6B illustrates a second possible orientation combination of the example gripper pads.

FIG. 6C illustrates a third possible orientation combination of the example gripper pads.

DETAILED DESCRIPTION OF THE PREFERRED EMBODIMENT

Figure 1:
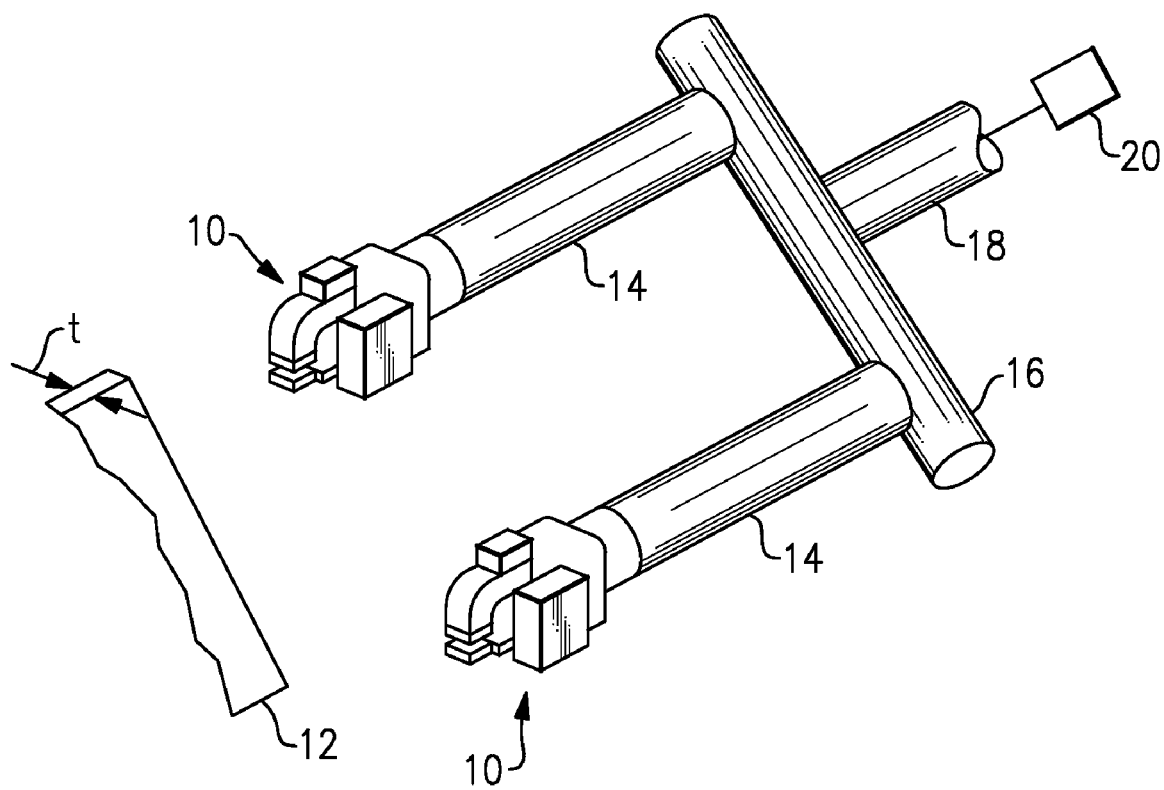
FIG. 1 illustrates example gripper assemblies for moving work pieces between work stations.

FIG. 1 illustrates selected portions of several gripper assemblies 10 used in an example industrial setting to grip and move a work piece 12 (shown schematically). The gripper assemblies 10 may be used in a variety of different configurations and different settings from that shown. In the illustrated example, the gripper assemblies 10 are coupled to extended arms 14, which are each secured to a rail 16. An adapter arm 18 is secured to the rail 16. An automated machine 20, such as a robot, moves the adapter arm 18, the extended arms 14, and the gripper assemblies 10 to desired positions to retrieve and deposit the work pieces 12, such as between work stations.

Figure 2:
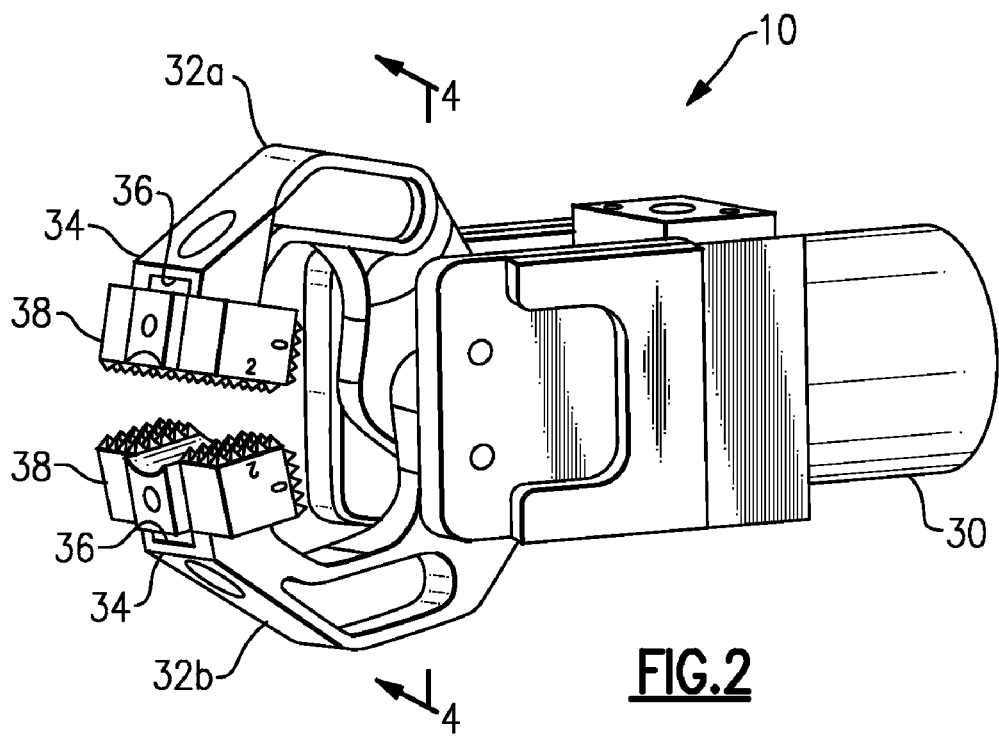
FIG. 2 illustrates an example gripper assembly from FIG. 1.

Referring to FIG. 2, each of the gripper assemblies 10 includes an actuator 30, such as a pneumatic or hydraulic actuator. It is to be understood that other types of actuators may also be used. The actuator selectively reciprocates a piston (not shown) to open or close gripper jaws 32a and 32b in a known manner. In this example, each of the gripper jaws 32a and 32b includes an end portion 34 having a recess 36 for mounting a gripper pad 38 (i.e. a tip). The gripper pads 38 of the disclosed example are adjustable between several different orientations to provide a variety of different possible spacings between the gripper jaws 32a and 32b for accommodating work pieces 12 of varying thicknesses t (FIG. 1).

Figure 3:
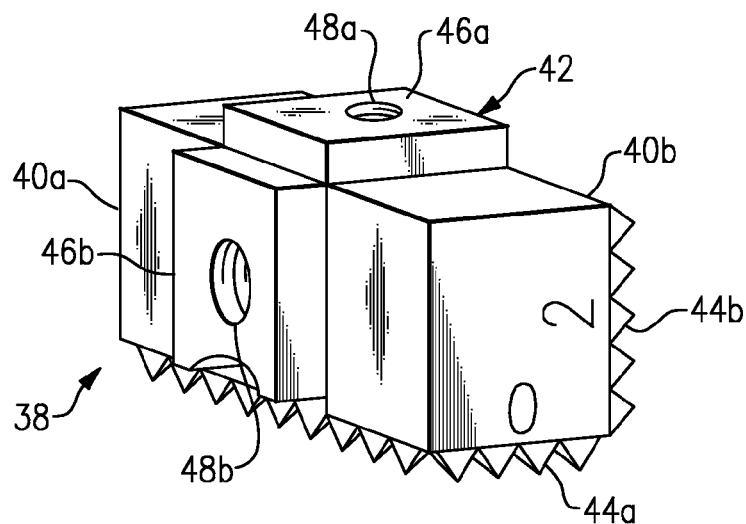
FIG. 3 illustrates a gripper pad of the gripper assembly shown in FIG. 2.

Referring to FIG. 3, each of the gripper pads 38 includes a first pad section 40a and a second pad section 40b. The pad sections 40a and 40b are connected to opposite sides of a mounting portion 42. In this example, each of the pad sections 40a and 40b are rectangular block-shaped and have a first gripping surface 44a on one side of the block and a second gripping surface 44b on another side that is directly adjacent to the side of the first gripping surface 44a. In the disclosed example, the directly adjacent sides having the gripping surfaces 44a and 44b are generally perpendicular to each other. This provides the benefit of only having to rotate the gripper pad 38 90° to switch between the different orientations provided by the two gripping surfaces 44a and 44b.

The gripping surfaces 44a and 44b each include a patterned texture, such as a toothed pattern, that provides traction for gripping the work piece 12. The patterned texture may be formed on or from the gripping surfaces 44a, 44b, such as by machining. Alternatively, the patterned textures may be provided by separate pieces, such as rubber or metal pads, that are attached to the respective gripping surfaces 44a, 44b. In the disclosed example, the patterned texture of each of the gripping surfaces 44a and 44b is the same. Optionally, different patterned textures may be used where different degrees of traction are desired.

In the illustrated example, the mounting portion 42 is positioned between the pad sections 40a and 40b. The mounting portion 42 includes a first extended face 46a associated with the first gripping surface 44a and a second extended face 46b associated with the second gripping surface 44b. Each of the extended faces 46a and 46b protrude beyond the surfaces the pad sections 40a and 40b. This allows the extended faces 46a and 46b to be received at least partially into the recess 36 of the gripping jaw 32a or 32b. so that the mountinn portion 42 functions as a pilot to orient the gripper tip 38. In some examples, the extended faces 46a and 46b are sized to fit relatively tightly within the recesses 36. In some examples though, there may be some play between the extended faces 46a and 46b and the recesses 36. This provides the advantage of locking the gripping pads 38 within the recesses 36 and prevents relative rotation between the gripping pad 38 and the jaw 32a or 32b.

Figure 4:
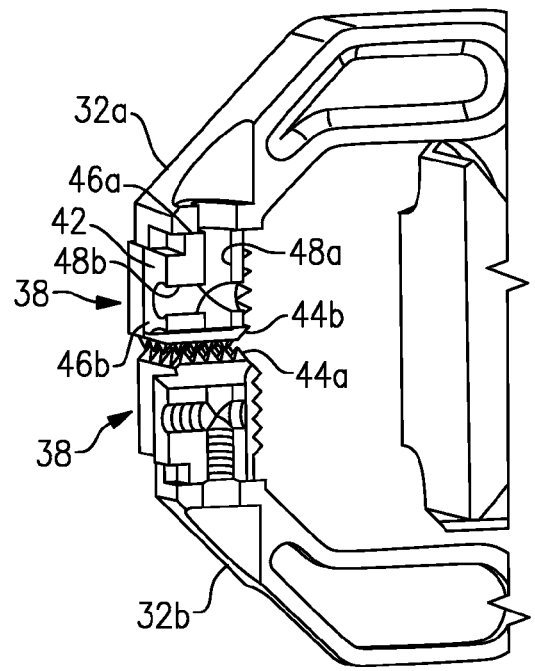
FIG. 4 illustrates a cross-section of the gripper pads shown in FIG. 2.

As can be appreciated from FIGS. 3 and 4, the mounting portion 42 also includes a first opening 48a that extends through the first extended face 46a and a second opening 48b that extends through the second extended face 46b. In the illustrated example, the openings 48a and 48b are threaded to receive a threaded fastener for securing the gripping pads 38 on the jaws 32a and 32b.

Figure 5:
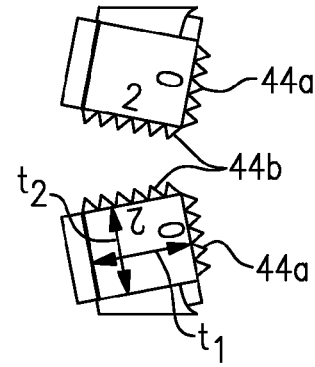
FIG. 5 illustrates a side view of the gripper pads shown in FIG. 2.

FIG. 5 shows a side view of the gripper pads 38 to illustrate a difference in thickness of the gripping pads 38 along different directions that provides adjustability for varying work piece 12 thicknesses t (FIG. 1). In this example, each of the gripping surfaces 44a and 44b has an associated gripper pad thickness. The first gripping surface 44a has a pad thickness $t_1$ and the second gripping surface 44b has an associated pad thickness $t_2$. In this example, the pad thickness $t_1$ is greater than the pad thickness $t_2$. Optionally, the gripping surfaces 44a and 44b may be designated with an identification number, such as the numbers "0" and "2" shown in the figure. This provides the benefit of visual indication of the gripper pad 38 orientation.

Referring to FIGS. 6A, 6B, and 6C, the gripper pads 38 may be secured within the recesses 36 of the jaws 32a and 32b using either the first extended face 46a or the second extended face 46b. The first extended face corresponds to the first gripping surface 44a and the second extended face corresponds to the second gripping surface 44b. That is, the selected extended face 46a or 46b controls which gripping surface 44a or 44b will be used for gripping.

The adjustability of the gripping pads 38 along with the different pad thicknesses $t_1$ and $t_2$, provide three combinations of gripper pad orientations to accommodate three different work piece 12 thicknesses t. In the example shown in FIG. 6A, each of the gripper pads 38 is shown schematically secured to the jaw 32a. This orients both gripper pads 38 along the pad thickness $t_1$ and provides a first distance $D_1$ between the gripper pads 38 when the jaws 32a and 32b are closed to accommodate relatively thin work pieces 12.

In the example shown in FIG. 6B, one of the gripper pads 38 is secured with the second extended face 46b to orient the pad along the thickness $t_2$, which is less than the pad thickness $t_1$ in the disclosed example. The combination of using one pad along thickness $t_1$ with the other pad along thickness $t_2$ provides a second, intermediate distance $D_2$ between the gripper pads 38. This provides the benefit of accommodating a work piece of intermediate thickness t, but thicker than a work piece that can be accommodated by the example shown in FIG. 6A.

In the example shown in FIG. 6C, both the gripper pads 38 are secured with the second extended face 46b to orient the pads 38 along the $t_2$ direction. This provides a distance $D_3$ between the gripper pads 38 to accommodate a relatively thicker work piece 12 than can be accommodated in the examples shown in FIG. 6A or 6B.

In one example, the gripper pad 38 thicknesses $t_1$ and $t_2$ are selected to provide a desired distance range between the jaws 32a and 32b. For example, the $t_1$ and $t_2$ thicknesses are selected such that in the "0-0" orientation (i.e., the visual indication of the orientation) shown in FIG. 6A, the jaws 32a and 32b can accommodate work piece 12 thicknesses t in the range of 0 mm to 2 mm. In the "0-2" orientation shown in FIG. 6B, the jaws 32a and 32b can accommodate work piece 12 thicknesses t in the range of 2 mm to 4 mm. In the "2-2" orientation shown in FIG. 6C, the jaws 32a and 32b can accommodate work piece 12 thicknesses t in the range of 4 mm to 6 mm. Given this description, one of ordinary skill in the art will recognize gripper pad 38 thicknesses to meet their particular needs.

Figure 7:
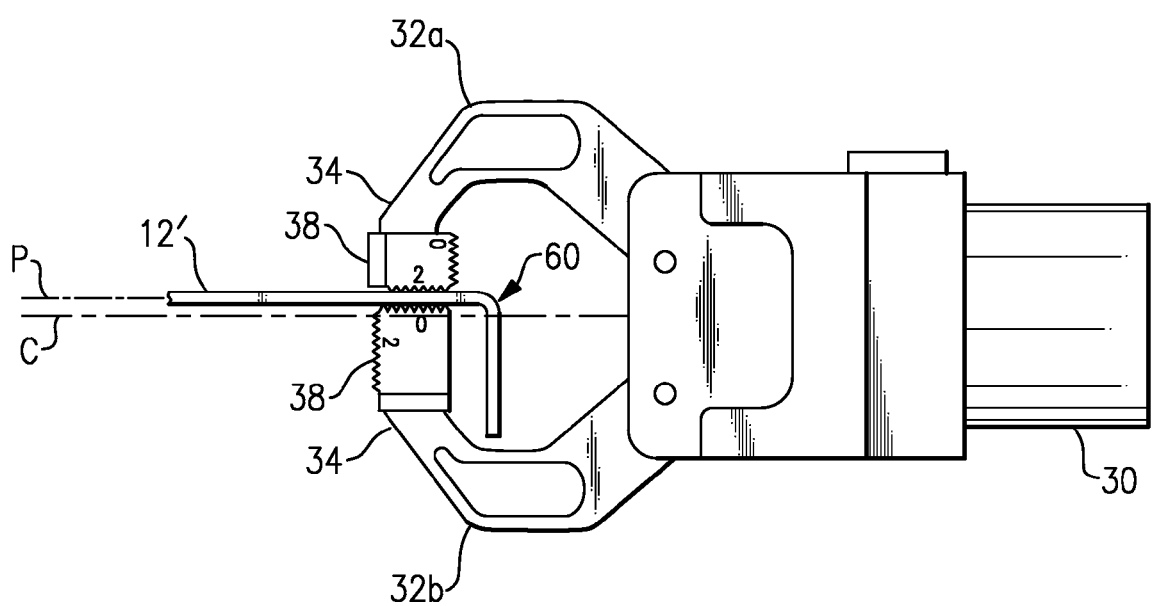
FIG. 7 illustrates a side view of an example gripper having gripper pads that are oriented to accommodate a work piece.

In the example shown in FIG. 7, the gripper pads 38 may also be used to accommodate work pieces of varying shapes. For example, work piece 12' includes a bent end 60. To grip the work piece 12', the gripper 10 requires more space toward the lower jaw 32b (between the jaws 32a and 32b) to accommodate the bent end 60. The gripper pads 38 are oriented to provide the additional space. The bottom gripper pad 38 in the figure is oriented in the "0" orientation along its $t_1$ thickness and the top gripper pad 38 is oriented in the "2" orientation along its $t_2$ thickness such that a gripping plane P between the gripper pads 38 is offset from a centerline C of the gripper 10 (e.g., the centerline is the central axis of the cylindrical actuator 30). The offset griping plane P provides a shift of the work piece 12' upwards in the figure to accommodate the length of the bent end 60 within the bottom jaw 32b. That is, upon closing, the bottom jaw 32b does not contact or interfere with the work piece 12'.

The disclosed example gripper pads 38 therefore provide the advantage of allowing an operator to adjust the gripper assembly 10 to accommodate work pieces 12, 12' of varying thicknesses or shapes without having to replace or substitute different gripper pads. In the disclosed examples, the operator need only to remove the fastener (e.g., a threaded fastener) from the gripper pad 38, rotate the gripper pad 90°, and secure the fastener to the gripper pad 38 to adjust the gripping range of the jaws 32a and 32b. In some examples, this eliminates the need for replacement gripper pads, which require storage space and are vulnerable to misplacement in some prior gripper assemblies.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A gripper tip for use with a gripper assembly, the gripper tip comprising:
   a first gripping surface located at least partially within a first plane, the first gripping surface having a first gripping height relative to a first attachment portion associated with the first gripping surface;
   a second gripping surface located at least partially within a second plane that is transverse to the first plane, the second gripping surface having a second gripping height relative to a second attachment portion associated with the second gripping surface, and the second gripping height is greater than the first gripping height; and
   a rectangular block, wherein two adjacent sides of the rectangular block include, respectively, the first attachment portion and the second attachment portion protruding therefrom.

2. The gripper tip as recited in claim 1, wherein the first plane is perpendicular to the second plane.

3. The gripper tip as recited in claim 1, wherein the first gripping surface is directly adjacent the second gripping surface.

4. The gripper tip as recited in claim 1, wherein each of the first gripping surface and the second gripping surface includes a patterned texture, and the patterned texture of the first gripping surface is the same as the patterned texture of the second gripping surface.

5. The gripper tip as recited in claim 1, wherein the first gripping height corresponds to a first nominal thickness between the first gripping surface and a first opposite surface, and the second gripping height corresponds to a second nominal thickness between the second gripping surface and a second opposite surface.

6. The gripper tip as recited in claim 5, wherein the first attachment portion protrudes from the first opposite side, and the second attachment portion protrudes from the second opposite side.

7. The gripper tip as recited in claim 1, comprising a rectangular block, wherein two adjacent sides of the rectangular block include, respectively, the first gripping surface and the second gripping surface.

8. The gripper tip as recited in claim 1, further comprising at least one visual indicator identifying at least one of the first gripping surface or the second gripping surface.

9. A gripper assembly comprising:
   a first gripper jaw;
   a second gripper jaw;
   an actuator for moving the gripper jaws;
   a first gripper tip removably attachable to the first gripper jaw in at least two different orientations relative to the first gripper jaw; and
   a second gripper tip removably attachable to the second gripper jaw in at least two different orientations relative to the second gripper jaw, the combination of the at least two different orientations of the first gripper tip and the at least two different orientations of the second gripper tip providing at least three different possible jaw opening sizes between the first gripper tip and the second gripper tip for a given position of the first gripper jaw and the second gripper jaw, wherein each of the first gripper tip and the second gripper tip comprises a rectangular block having two adjacent sides, one of the sides including a first attachment portion that protrudes therefrom and the other side including a second attachment portion protruding therefrom.

10. The gripper assembly as recited in claim 9, wherein the first gripper jaw includes a first recess for receiving the first attachment portion, and the second gripper jaw includes a second recess for receiving the second attachment portion.

11. The gripper assembly as recited in claim 9, wherein the actuator comprises a fluid-driven actuator.

\* \* \* \* \*